US012614874B2

(12) United States Patent
Hommedal

(10) Patent No.: US 12,614,874 B2
(45) Date of Patent: Apr. 28, 2026

(54) ROV MATEABLE SUBSEA COUPLER

(71) Applicant: SIEMENS ENERGY GLOBAL GMBH & CO. KG, Munich (DE)

(72) Inventor: Steinar Hommedal, Sandvika (NO)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 314 days.

(21) Appl. No.: 18/565,157

(22) PCT Filed: May 30, 2022

(86) PCT No.: PCT/EP2022/064642

§ 371 (c)(1),
(2) Date: Nov. 29, 2023

(87) PCT Pub. No.: WO2022/253770

PCT Pub. Date: Dec. 8, 2022

(65) Prior Publication Data

US 2024/0243515 A1 Jul. 18, 2024

(30) Foreign Application Priority Data

Jun. 1, 2021 (GB) .................................... 2107797

(51) Int. Cl.
*H01R 13/523* (2006.01)
*H01R 13/627* (2006.01)

(52) U.S. Cl.
CPC ....... *H01R 13/523* (2013.01); *H01R 13/6275* (2013.01); *H01R 13/6272* (2013.01)

(58) Field of Classification Search
CPC .............. E21B 33/038; H01R 13/6275; H01R 13/6272; H01R 13/523
(Continued)

(56) References Cited

U.S. PATENT DOCUMENTS 4,721,358 A * 1/1988 Faber .................... H01R 13/66 439/786
7,001,200 B2 * 2/2006 Yoshie .................. G06F 3/0231 439/358
(Continued)

FOREIGN PATENT DOCUMENTS

CN 104051875 A 9/2014
EP 2644442 A2 * 10/2013 .............. B60L 53/16
(Continued)

OTHER PUBLICATIONS

PCT International Search Report and Written Opinion of the International Searching Authority mailed Nov. 11, 2022 corresponding to PCT Application No. PCT/EP2022/064642 filed May 30, 2022.

*Primary Examiner* — Marcus E Harcum

(57) ABSTRACT

An ROV mateable subsea coupler (30) comprises a housing (31) having a first end and a second end and defining a hollow core. The first end of the housing is adapted to be mounted to a first wet mate connector part (21). The second end (32) of the housing is adapted to receive a second wet mate connector part. The coupler further comprises a lever arm (35) pivotally mounted to the housing, the lever arm comprising a latch (46) adapted to cooperate with a surface of a guide piece (40, 41) of the second connector part (20). The lever arm comprises a resilient member (37, 78), remote from the latch and from the second end (32) of the housing, which biases the lever arm towards a closed position, coaxial with a longitudinal axis (72) of the housing, in which position the latch protrudes through an aperture (66) in the housing.

16 Claims, 8 Drawing Sheets

Figure 1A:
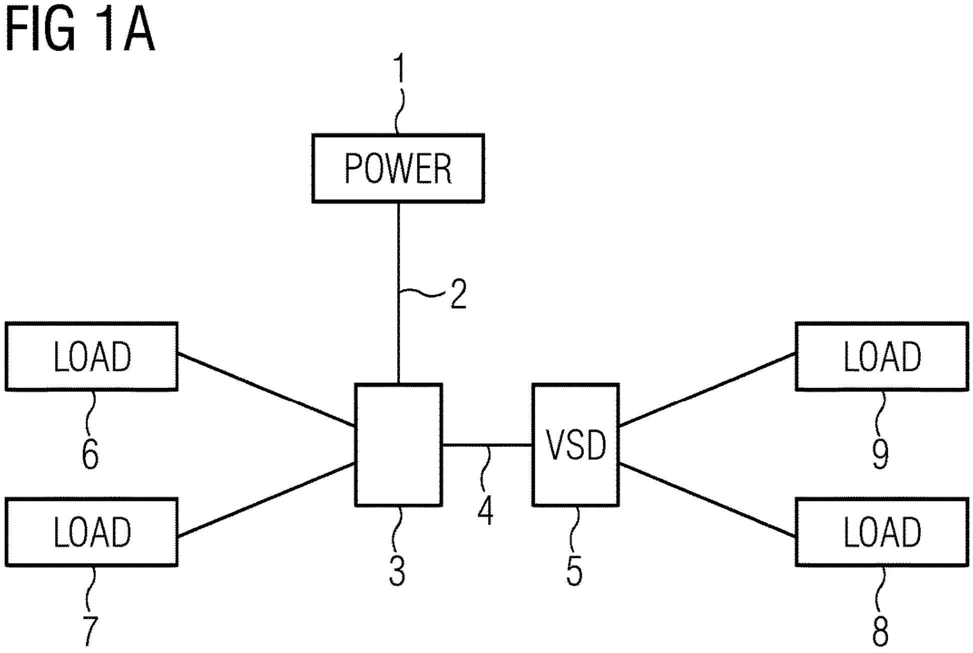

(58) Field of Classification Search
USPC .................................................. 439/350, 358
See application file for complete search history.

(56) References Cited

U.S. PATENT DOCUMENTS

| | | | | |
|---|---|---|---|---|
| 8,449,314 | B1 * | 5/2013 | Feist | H01R 13/512 439/358 |
| 8,573,998 | B2 * | 11/2013 | Ichio | H01R 13/5227 439/372 |
| 8,632,353 | B2 * | 1/2014 | Rassoolkhani | H01R 13/62 439/358 |
| 9,343,846 | B2 * | 5/2016 | Burrow | H01R 13/5219 |
| 9,362,662 | B2 * | 6/2016 | McKay | H01R 13/627 |
| 9,509,095 | B2 * | 11/2016 | Ohmura | B60L 53/16 |
| 11,777,256 | B2 * | 10/2023 | Fan | H01R 13/639 439/489 |
| 2010/0246142 | A1 * | 9/2010 | Phillips | H01R 13/6275 361/747 |
| 2011/0212645 | A1 * | 9/2011 | Osawa | B60L 53/16 439/352 |
| 2011/0294328 | A1 * | 12/2011 | Katagiri | B60L 53/16 439/304 |
| 2015/0343915 | A1 * | 12/2015 | Murakami | H01R 13/6395 307/130 |
| 2017/0062986 | A1 * | 3/2017 | Sasaki | B60L 53/18 |
| 2018/0375254 | A1 * | 12/2018 | Lu | H01R 13/6275 |
| 2019/0058295 | A1 * | 2/2019 | Beimdieck | B60L 53/16 |
| 2022/0304392 | A1 * | 9/2022 | Hoch | A24F 40/57 |

FOREIGN PATENT DOCUMENTS

| | | | | | |
|---|---|---|---|---|---|
| EP | 3396784 | A1 | | 10/2018 | |
| EP | 3950408 | A1 | * | 2/2022 | H01R 13/639 |
| FR | 2517481 | A1 | | 6/1983 | |
| GB | 2490040 | A | | 10/2012 | |
| TW | 201628279 | A | * | 8/2016 | H01R 13/6275 |

* cited by examiner

ROV MATEABLE SUBSEA COUPLER

This invention relates to a coupler for subsea, or underwater, power connector parts and an associated method of coupling.

Subsea power grids comprise multiple elements all interconnected, typically by wet-mate connectors. The elements of a subsea grid may include one or more subsea transformers, subsea switchgear, subsea variable speed drives and a low voltage distribution and communication system, all interconnected by connectors. The coupling of the wet mate connectors subsea generally requires an ROV to bring a flying connector part to a fixed connector part, located on a piece of equipment, housing, or frame, but may also involve coupling two flying connectors. Improvements to ROV coupling of wet-mate connectors are desired.

In accordance with a first aspect of the present invention, an ROV mateable subsea coupler for subsea coupling of a first wet mate connector part to a second wet mate connector part, the subsea coupler comprising a housing having a longitudinal axis, a first end and a second end and defining a hollow core, the longitudinal axis running along the centreline of the hollow core and adapted to be co-axial with a centreline of the first and second wet mate connector parts; wherein the first end of the housing is adapted to be mounted to the first wet mate connector part; wherein the second end of the housing is adapted to receive the second wet mate connector part; wherein the coupler further comprises a lever arm pivotally mounted to the housing; wherein the lever arm comprises a latch adapted to cooperate with a surface of a guide piece of the second connector part; wherein the lever arm comprises a resilient member on a mount, the mount comprising a mount axis adapted to be arranged substantially perpendicular to the longitudinal axis of the housing when the lever arm is in its open position, the resilient member being remote from the latch and from the second end of the housing; wherein the resilient member biases the lever arm towards a closed position, coaxial with a longitudinal axis of the housing, in which position the latch protrudes through an aperture in the housing and wherein the mount axis of the resilient member on the mount is arranged at an acute angle to the longitudinal axis of the housing when the lever arm is in its closed position.

The latch at the end of the lever arm passes through an aperture close to the open end of the hollow coupler housing and is held there by the force exerted by the resilient member at the other end of the lever arm. The latch cooperates with a guide surface on the second wet mate connector part, in use, and the resilient member of the pivot arm allows the latch to move up sufficiently for the second connector part to pass into the housing, then holds the first and second wet mate connector parts in contact after mating.

The resilient member may comprise a spring in compression, or a compressible rubber washer.

The spring in compression, or pre-loaded spring, is pre-loaded before fitting, in order to bias the lever arm towards its closed position when no other forces are applied.

The coupler may further comprise a secondary pivot arm, mounted to the outboard end of the housing.

The secondary pivot arm provides a short term holding function to prevent the second connector part from coming out entirely during demating, when the pivot arm is first unlatched.

The first wet mate connector part may further comprise a guide member to guide the second wet mate connector part into the first wet mate connector part and provide coarse alignment of the connector parts.

The guide member provides coarse alignment of the plug with the receptacle and fine alignment is provided by internal features of the plug and receptacle.

The first guide member may comprise a conical inner surface.

The first guide member may comprise one or more cylindrical outer surface sections.

This allows the guide member to fit within the substantially cylindrical inner surface of the coupler housing.

The second wet mate connector part may further comprise a second guide member to guide the latch toward the flange.

The first wet mate connector part may comprise a receptacle and the second wet mate connector part comprises a plug.

The second wet mate connector part may be connected to a cable, jumper or hose and the first wet mate connector part, may be fixedly mounted to a subsea module or frame.

Typically, the plug is ROV flyable and the receptacle is fixed, but in some situations, both plug and receptacle may be flyable.

At least one of the housing, or lever arm may comprise a metal

The metal housing may comprise carbon steel, or stainless steel, in particular austenitic stainless steel, or super-duplex.

The first and second guide pieces may comprise a plastic, thermoplastic or seawater resistant metal.

In accordance with a second aspect of the present invention, a method of coupling a first subsea connector part to a second subsea connector part, the connector parts comprising a first wet mate connector part and a second wet mate connector part; the method comprising mounting a coupler housing to the first wet mate connector part; mounting a guide piece to the second wet mate connector part, gripping a handle of the second wet mate connector part with a manipulator of a remotely operated vehicle; using the manipulator to move the second wet mate connector part towards an opening in the coupler housing; causing a lever arm of the coupler to slide over the guide piece and locate behind a flange adjacent to the guide piece; wherein a resilient member of the lever arm is arranged on a mount comprising a mount axis, wherein the mount axis is arranged to be substantially perpendicular to the longitudinal axis of the housing when the lever arm is in its open position, and biases the lever arm in position to hold the connectors in their mated state, wherein the resilient member of the lever arm is arranged is arranged on its mount with the mount axis at an acute angle to the longitudinal axis of the housing, when the lever arm is in its closed position.

In accordance with a third aspect of the present invention, a method of decoupling a first subsea connector part from a second subsea connector part to which it is mated, the connector parts comprising a first wet mate connector part and a second wet mate connector part; the method comprising lifting a lever arm of a coupler with a manipulator arm of a remotely operated vehicle, such that a resilient member of the lever arm, on a mount, is moved to an open position, the longitudinal axis of the mount being substantially perpendicular to a longitudinal axis of the housing in the open position, the lever arm being moved against a force exerted by the resilient member, to disengage the lever arm latch from a flange adjacent to a guide piece on the second wet mate connector part; allowing the second wet mate connector part to disengage from the first wet mate connector part and move away from the first wet mate connector part until a secondary arm engages the flange on the second wet mate connector part; moving the manipulator to grip a handle of the second wet mate connector part; using the manipulator to disengage the second wet mate connector part from the secondary arm and move the second wet mate connector part away from an opening in the coupler housing to demate the first and second wet mate connector parts; and allowing the resilient member of the lever arm, on the mount, to return to a closed position, the longitudinal axis of the mount being at an acute angle to a longitudinal axis of the housing.

The coupling or decoupling may be from or to a module comprising one of a subsea transformer, a subsea compressor, a subsea variable speed drive, a subsea separator, or a module for an offshore wind turbine.

Figure 1B:
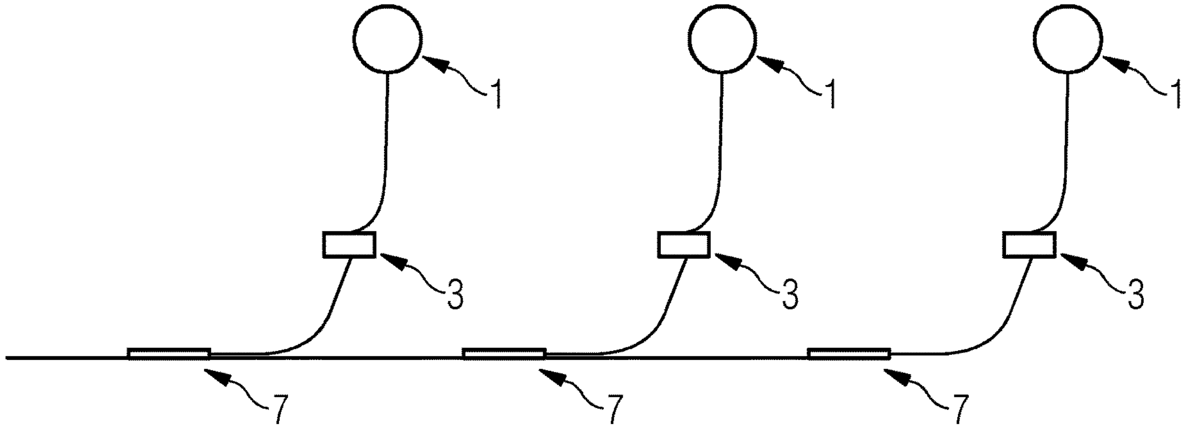
Figure 2A:
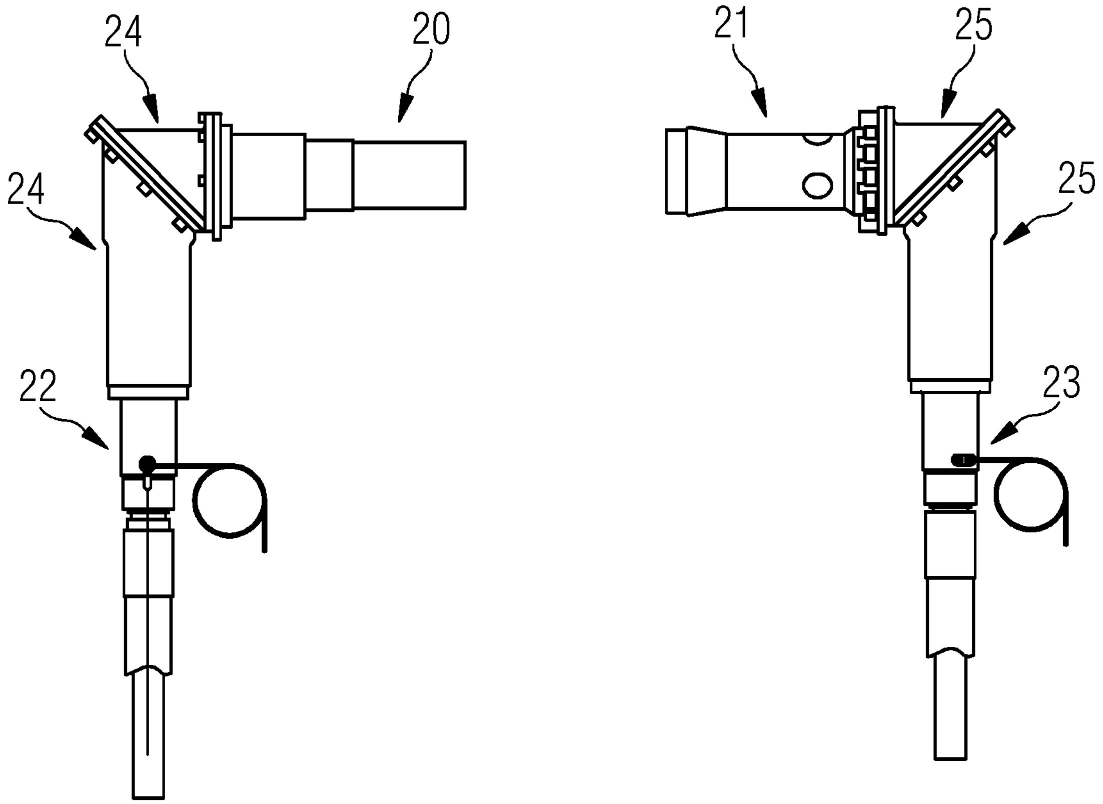
Figure 2B:
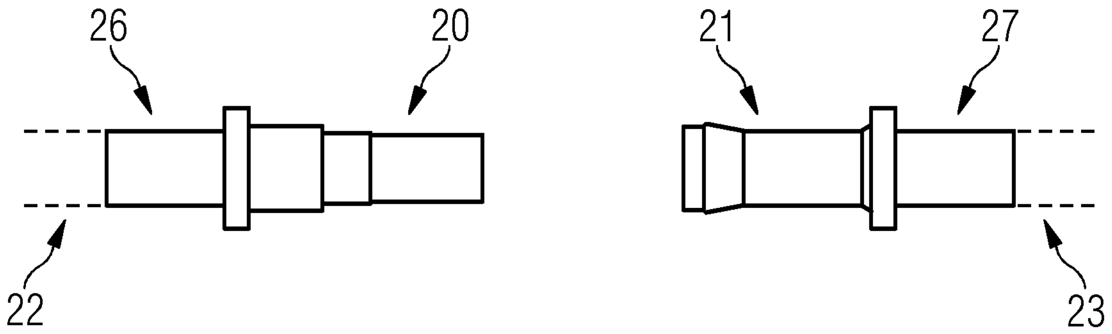
Figure 3A:
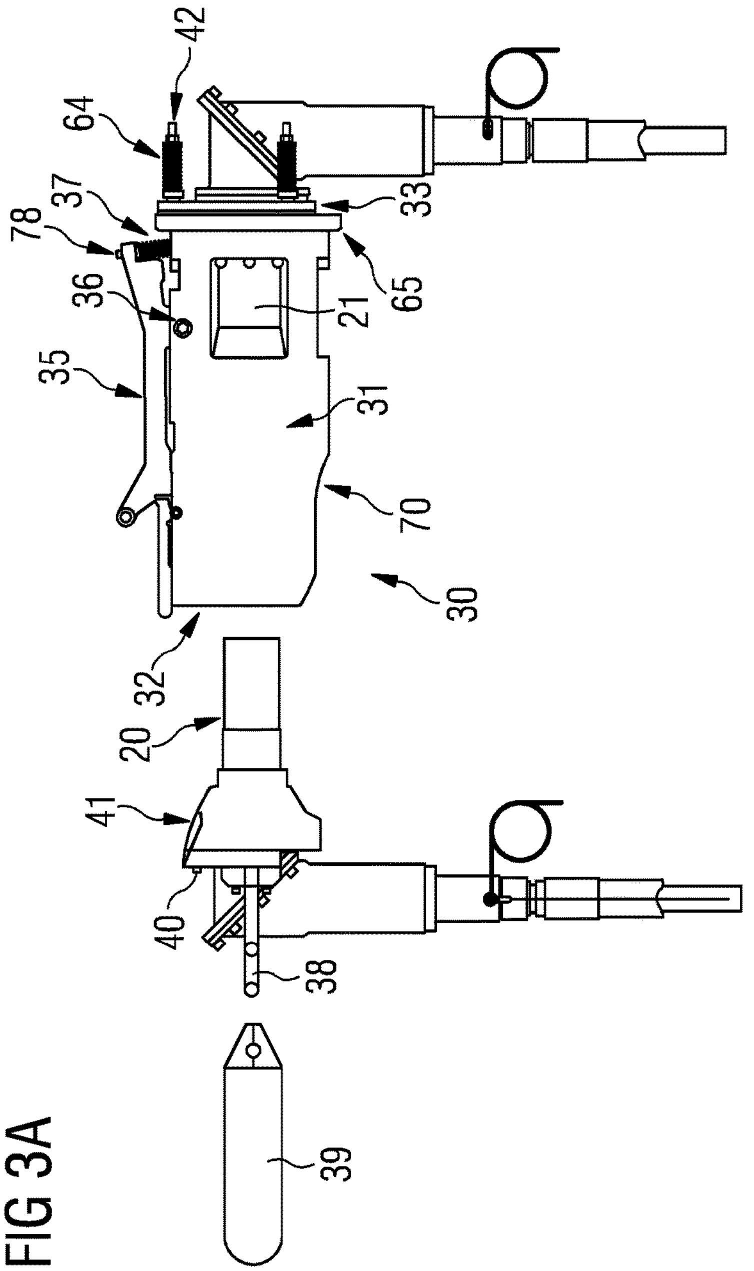
Figure 3B:
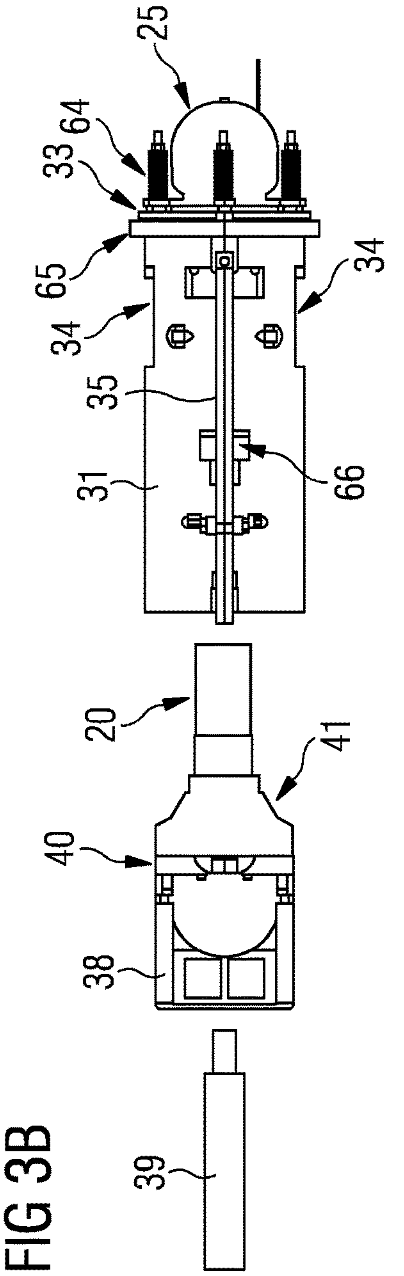
Figure 4:
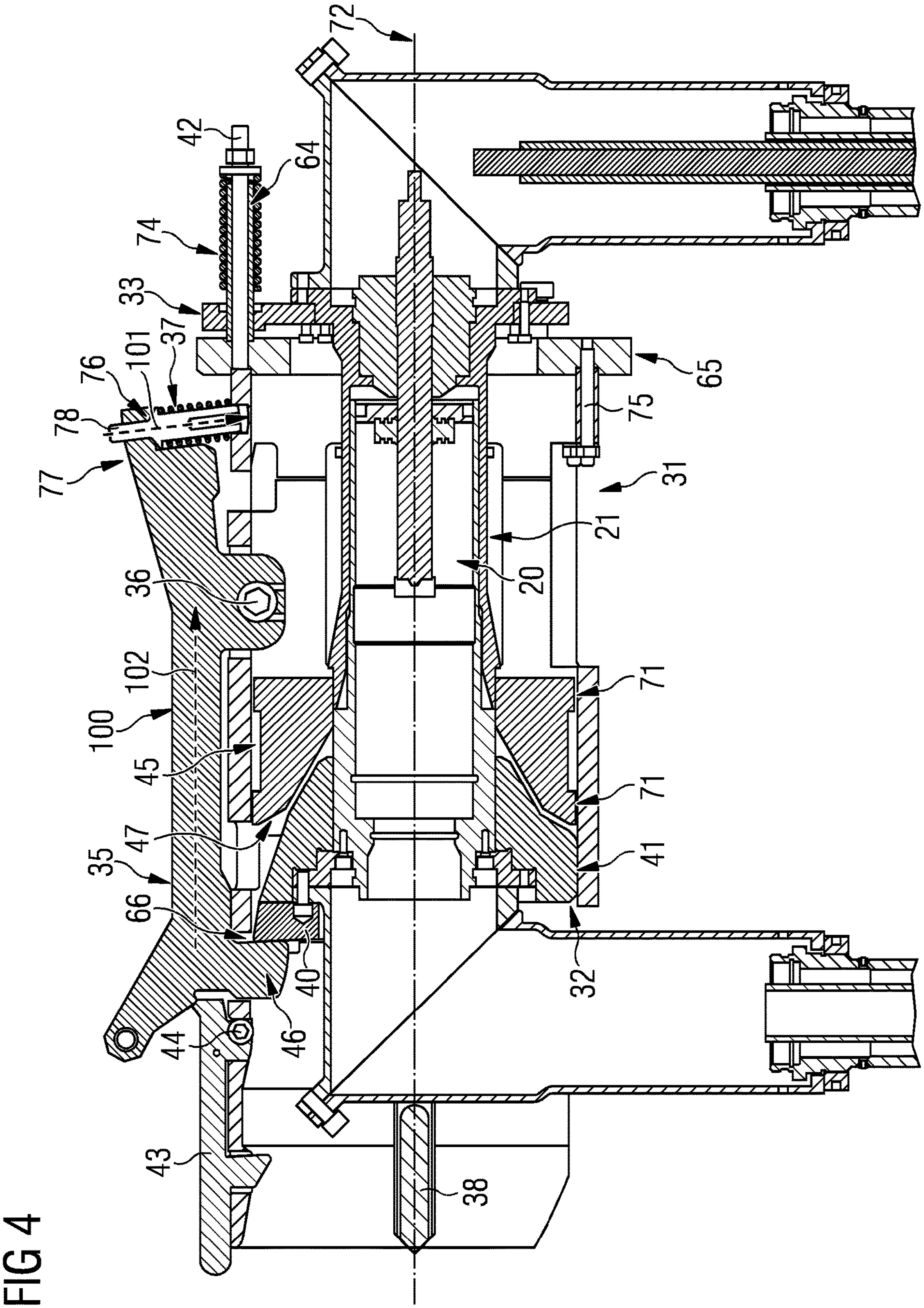
Figure 5A:
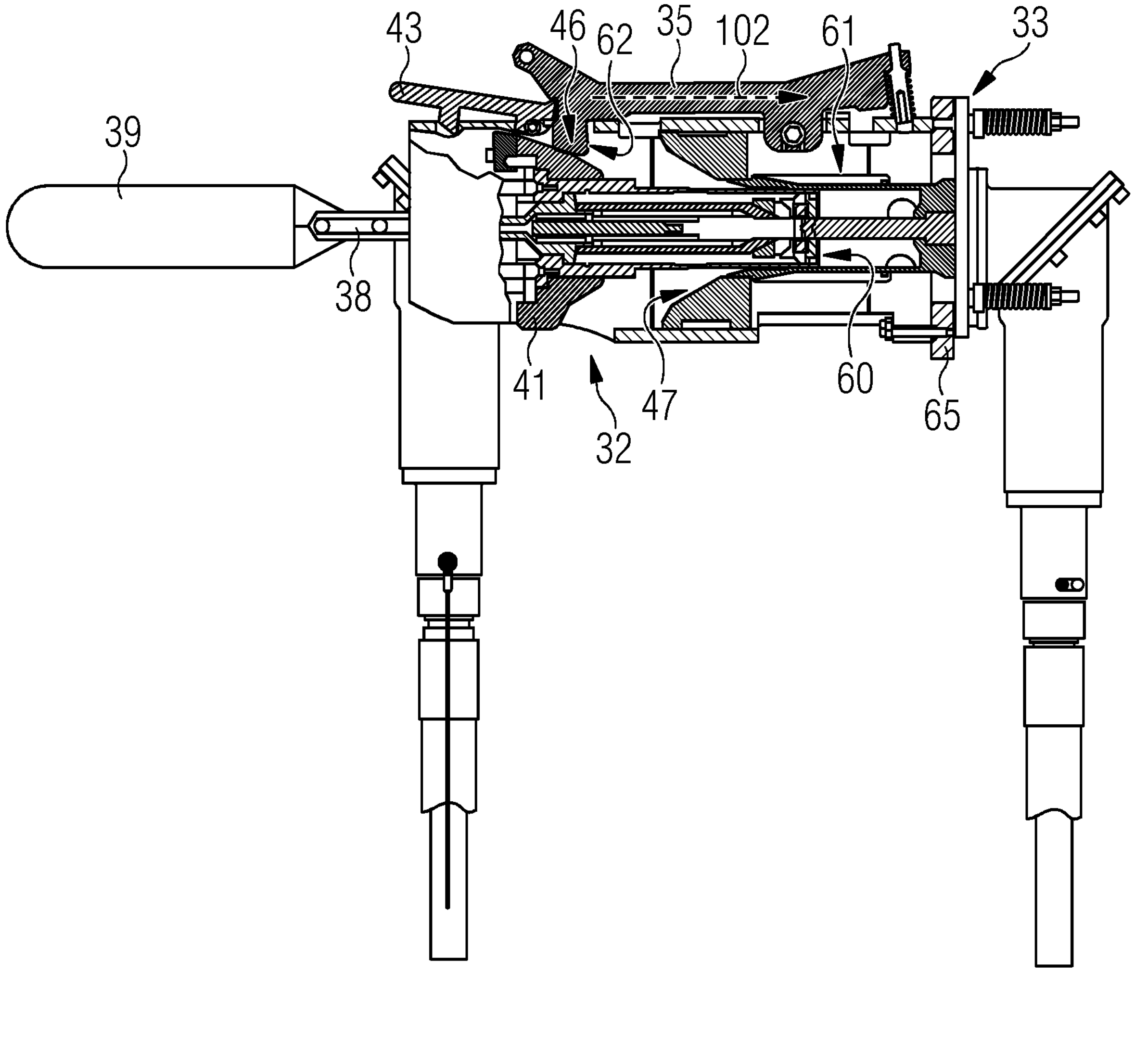
Figure 5B:
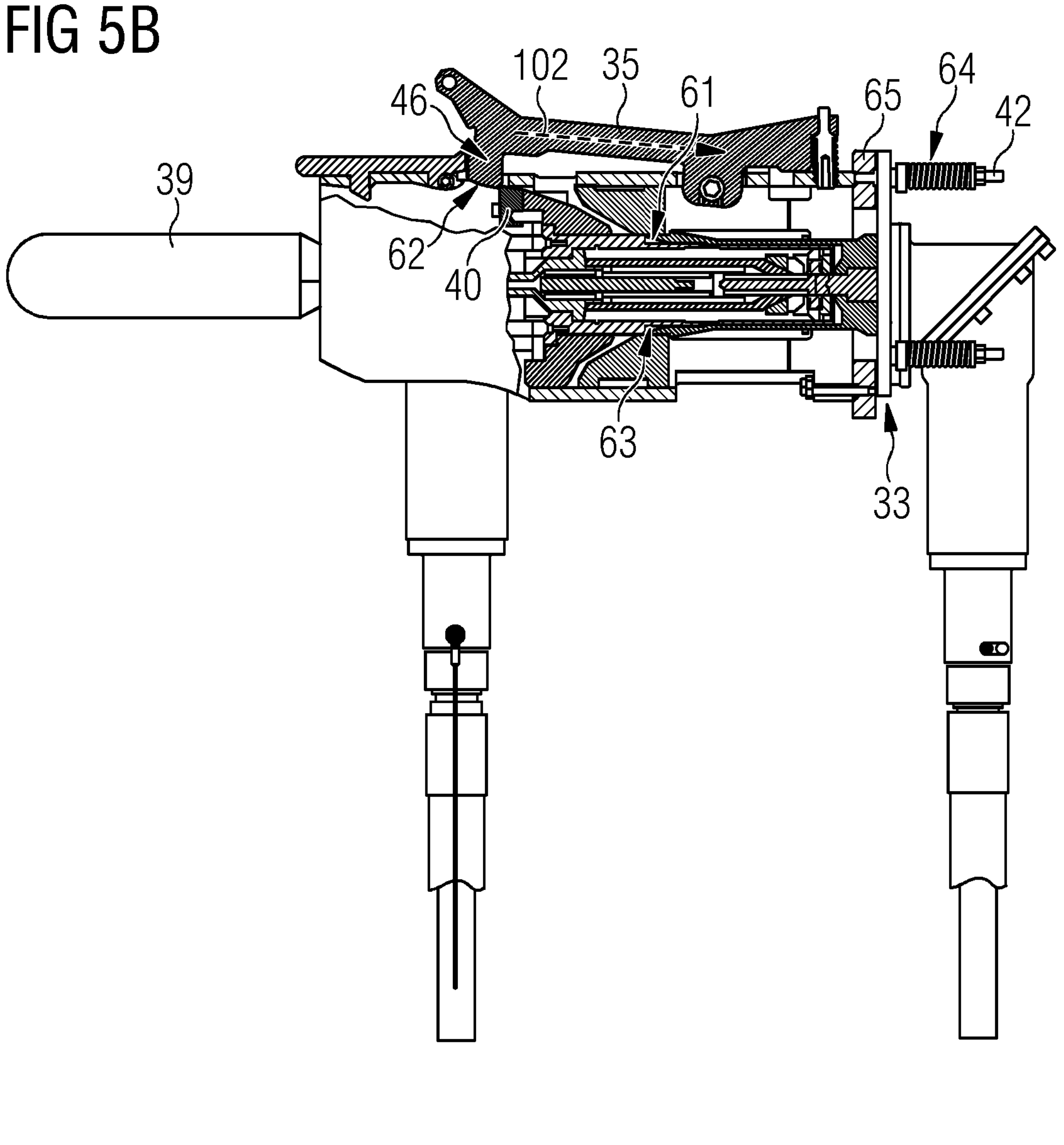
Figure 5C:
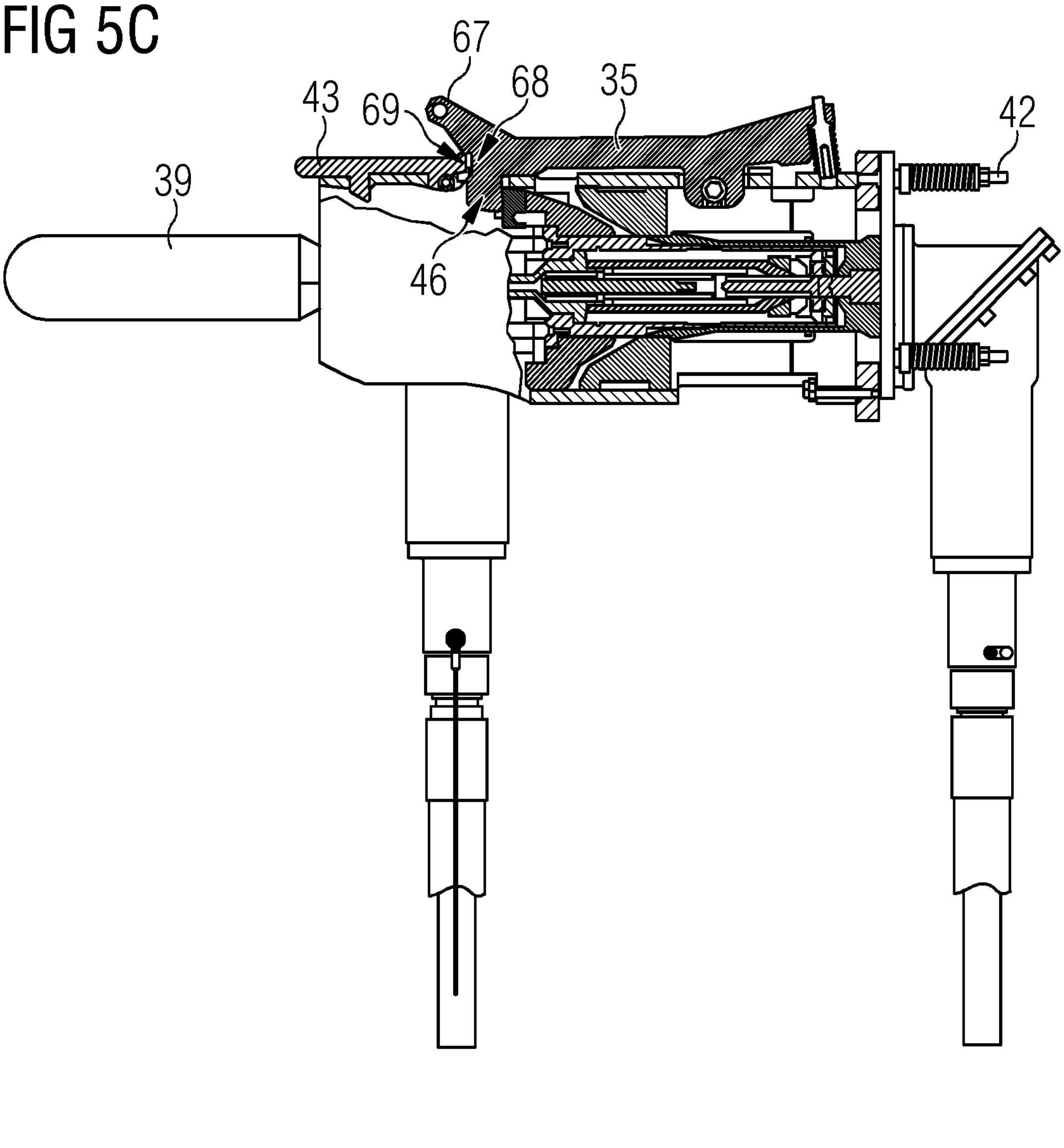
Figure 6:
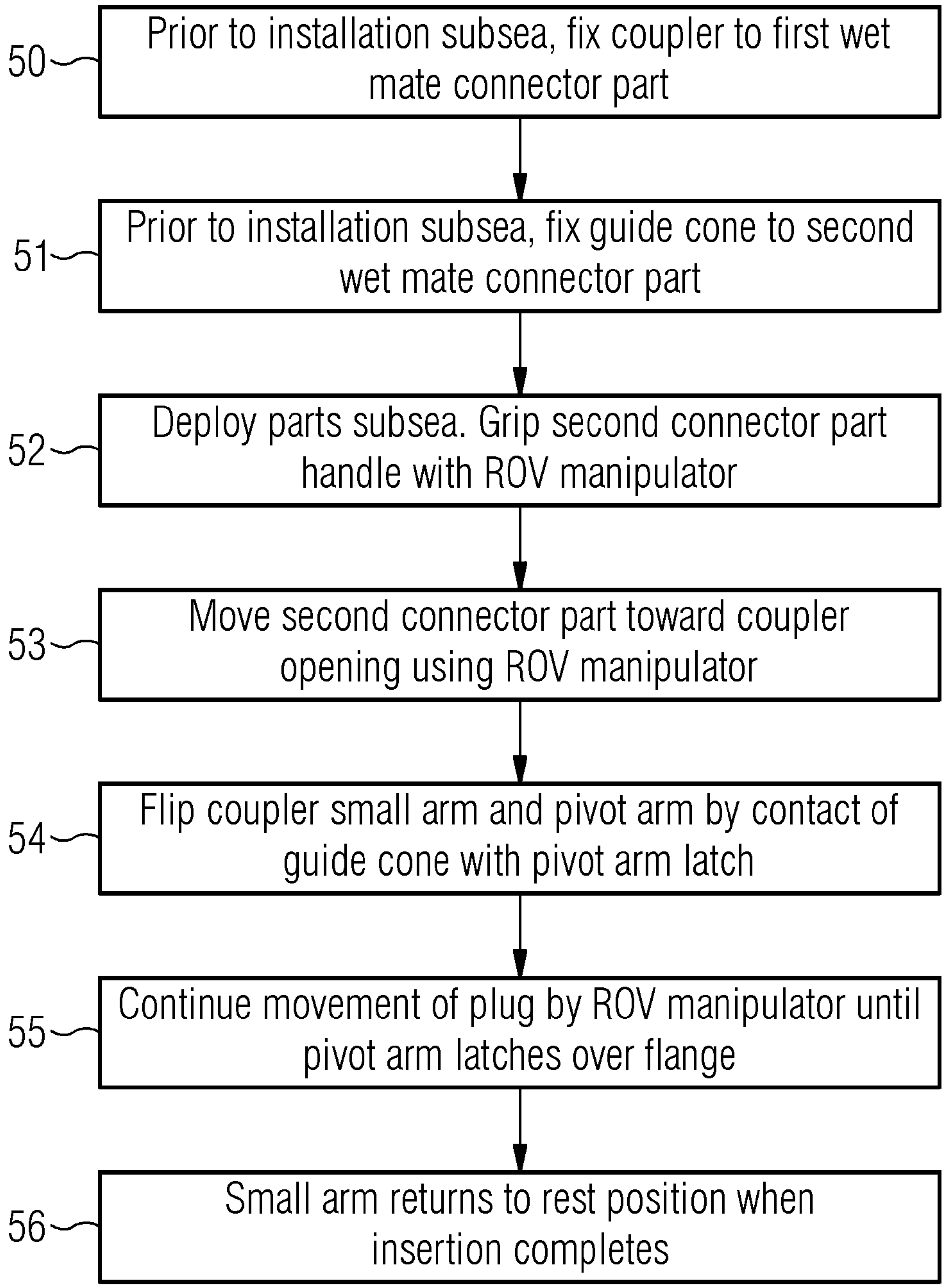

An example of a subsea coupler and associated method of coupling in accordance with the present invention will now be described with reference to the accompanying drawings in which:

FIGS. 1*a* and 1*b* illustrate examples of subsea grids in which the present invention may be used;

FIGS. 2*a* and 2*b* illustrate examples of wet mate connector parts with which a coupler according to the invention may be used;

FIG. 3*a* is a perspective view from one side of an example of a coupler according to the present invention, fitted to a first wet mate connector part, ready to receive a second wet mate connector part;

FIG. 3*b* is a view of the coupler of FIG. 2*a* from above;

FIG. 4 illustrates more detail of the coupler according to the present invention;

FIGS. 5*a*, 5*b* and 5*c* illustrate stages in a process of connecting two wet mate connector parts using a coupler according to the present invention; and, FIG. 6 is a flow diagram of a method of connecting two subsea wet mate connector parts using a coupler according to the present invention.

Electrical medium voltage or high voltage connections between subsea modules of a subsea power grid may comprise a cable of some weight and stiffness, as well as wet mate connectors that require careful mating. In a subsea power grid, the power grid may comprise a plurality of subsea modules, such as variable speed drives (VSD) installed at a location on the seabed and switchgear to distribute power to each drive from a transformer. Alternatively, the transformer may aggregate power from local sources, such as wind turbines and prepare to send that power to the shore, or supply that locally generated power to subsea modules. In the first case, the transformer is provided to transform power from a power source down to an operating voltage and supply power via the switchgear to the drives. Electric power may be transmitted to the subsea installation from a topside installation, e.g., via an umbilical from an offshore platform or ship, or via a subsea cable from an onshore site, or there may be incidental local power generated subsea, suitable for power applications. Higher voltages are often used for transmission of electric energy from a topside installation to the subsea installation, as this helps to limit losses. For some power generation offshore, e.g. from wind turbines, the voltage may need to be stepped up, so a suitable transformer is provided according to the power source.

Wet mate connectors comprise two connector parts, generally known as a plug and a receptacle. In most cases, cables for a subsea grid will have one connector part mounted at a fixed location, for example onto a subsea module, or a frame and the other connector part on a flying lead, i.e., fitted to a cable, umbilical or jumper that can be moved around underwater, e.g., by a diver or ROV. The connector part on the flying lead is connected to the fixed connector part when both are already underwater, for example by the ROV or diver carrying out the mating operation. However, it may also be possible that two flying leads need to be connected together beneath the water and the coupler of the present invention would be suitable for that operation as well. The description of the examples is mainly made with respect to the first case, with one fixed and one flying part, but the invention is not limited to that and a first fixed connector part, with a second flying connector part should also be read as covering both first and second flying connector parts.

FIG. 1*a* is a block diagram of a typical subsea power grid. Power from a power source 1 is fed via an umbilical 2 to a transformer 3. The transformer 3 is connected via jumpers 4 to one or more variable speed drives 5, or to loads 6, 7. The variable speed drives may also connect to loads 8, 9. The transformer 3 may be a step-down transformer if it brings power from a higher voltage than is required for operation of the VSDs 5 or loads 6 to 9, or it may be a step-up transformer if it aggregates locally generated power. In some subsea grids, both step up and step down transformers may be provided. The loads 6,7 connected to the transformer 3 and the loads 8, 9 connected to the variable speed drive may, for example be pumps, or compressors, driven by electric motors, or may be separators. Suitable wet mate connectors are provided to connect cables, umbilicals, or jumpers to each element of the grid. Alternatively, some of the components may be connected by dry mates before installation subsea, for example, the cables may have a dry mate connector at the transformer or VSD end and a wet mate connector to the loads. The second connector part may take the form of a protective cap that is put in place topside and removed and replaced with the functional second connector part subsea.

FIG. 1*b* is an illustration of an alternative subsea power grid, showing a system where power 1 is supplied, for example power generated by offshore wind turbines and consumed by loads 7 by connecting the generated power to a power cable which goes through a suitable transformer 3 to modules on the seabed by which the power from the wind turbine is connected to an export power cable on the seabed. That export may be a connection to the shore, or to local loads.

In three phase systems, all three phases have typically been arranged together which can lead to a large, heavy arrangement, that is hard to lift or connect using an ROV and in some cases cranes have been needed. Mating connectors one phase at a time reduces the size and weight, so that the mating can be carried out by a standard ROV. However, this had previously required specialist tooling, rather than just gripping the flying plug with the ROV. The design of the coupler of the present invention allows handling, alignment, mating and locking of connector parts for a single phase to be done by an ROV (Remotely Operated Vehicle), using its manipulator arm and grip without the need for any additional tools or equipment.

FIG. 2*a* illustrates an example of first and second connector parts, a plug 20 and receptacle 21, which are fitted to their cables 22, 23 via right angled fittings 24, 25. FIG. 2*b* illustrates an alternative arrangement whereby the plug 20 and receptacle 21 are fitted to their cables 22, 23 via straight fittings 26, 27. The invention is applicable to either type of connector part to cable fitting. As discussed above, the coupler is typically used with one connector part fixed in place via a mounting interface on a subsea module such as a variable speed drive (VSD), transformer or other subsea structure and the other connector part on a flying lead, although the coupler could be used with any two wet mate connector parts, such as two cables, directly in line, or two right angled cables, or one in-line and one with a right-angled fitting from those illustrated in FIGS. 2*a* and 2*b*. A flying plug and fixed receptacle is used in the following examples because it is the more common arrangement, given that the construction of the plug allows it to have a voltage on it without seawater damage if uncovered, whereas a receptacle must have a cap to keep the seawater out when not connected. However, inverting this arrangement to have the plug fixed and the receptacle flying, might be useful, for example, in switchgear which has several outputs, i.e., three phases for each motor.

FIGS. 3*a* and 3*b* illustrate an example of a subsea coupler 30 according to the present invention, in use, viewed from one side and above respectively. The coupler 30 comprises a housing 31, in this example, having a generally cylindrical cross section, with an open end 32 to receive one connector part and a closed end where the coupler 30 is mounted to another connector part by a structural interface 65, for example on a frame or module housing (not shown). A spring-loaded mounting flange 33 is attached to the receptacle, sliding on compliant mount sleeves 64 which are bolted to the structural interface 65 via pins 42. The closed end of the coupler prevents relative movement of a first connector part 21, in this example, a receptacle, with respect to the coupler housing 31, but is not completely sealed and includes apertures 34, seen more clearly from above in FIG. 3*b*, which allow seawater to pass through as the second connector part 20, in this example, a plug, is inserted into the housing 31 through the open end 32.

A pivot arm 35 is mounted onto the top of the housing 31 on a pivot 36, part way along the length of the pivot arm and biased by a bias actuator comprising a resilient member 37, located at the end of the pivot arm away from the plug, closest to the structural interface 65 and a mount 78. The pivot arm comprises a central section 100, a longitudinal axis 102 of which is adapted to be co-axial with the centreline 72 of the plug and receptacle parts of the connector, in the housing 31, when the pivot arm is latched in its closed position. The pivot 36 is at one end of the central section, a latch 46 at the other end, with the bias actuator 37, 78 beyond the pivot. The resilient member 37 may be a pre-loaded spring, or a compressible resilient material, such as a rubber washer, or sleeve. The plug 20 and receptacle 21 are adapted to be connected both electrically and mechanically when fully mated, but the coupler provides reliable mating when the wet mate is carried out by an ROV, rather than a diver. As can be seen in FIGS. 3*a* and 3*b*, a handle 38 is fitted to the plug at the end away from the coupler opening 32 and this handle can be gripped by an ROV manipulator 39, shown close to the handle, ready to grip the ROV handle on the plug part, in these figures. Once gripped, movement of handle 38 and plug 20 by the ROV manipulator 39 gradually inserts the plug into the coupler 30, until the plug is fully inserted into the receptacle. Additionally, the plug is provided with a flange 40 and guide piece 41 which interact with the pivot arm of the coupler as the plug is inserted into the coupler.

FIG. 4 shows more detail of the coupler in use. The handle 38, held by the ROV grip is used to bring the plug and receptacle together. The housing 31 is bolted to the structural interface 65 by head bolts 75 and the compliant mount sleeves 64 are bolted to the structural interface 65 by pin bolts 42 through the compliant mount sleeves (64) around the pins. A resilient member 74 provided outside the sleeves, may be a spring, but alternatives to a pre-loaded spring include a compressible resilient material, such as a rubber washer, or sleeve, as for the lever arm. The resilient member 37 of the pivot arm 35, in this example, a preloaded spring, can be seen close to the flange 33 and the interface 65. A shoulder 76 on a mount 78 of the resilient member 37 interacts with the underside of the end 77 of the lever arm 35. The resilient member is mounted substantially co-axial with a centreline 101 of the mount 78. To the left of the lever arm 35, close to the open end 32 of the housing 31, is a subsidiary, or small, arm 43, which acts as an ejection stopper lever. This arm 43 is pivotally mounted on pivot 44 to the top of the housing 31.

The housing provides the main body of the coupler 30 and internally is shaped to funnel the plug in towards the receptacle, for coupling. A taper is formed inside the housing 31, toward the receptacle, having a conical shaped inner profile 47, of a guide piece 45 mounted to the receptacle to complete the mating arrangement. The inner profile 47 of the guide piece 45 is generally conical and the outer profile is provided with one or more cylindrical outer surfaces 71 to cooperate with and fit to the inner surface of the otherwise generally cylindrical housing 31. The spring mating arrangement 37, 78 at the receptacle end of the lever arm 35 biases the lever arm to be generally aligned co-axial with a central longitudinal axis 72 of the housing, with the centreline 101 of mount 78 of the resilient member 37 being arranged at an acute angle to a longitudinal axis 72 of the housing when a central portion of the lever arm 35 is substantially co-axial with the axis 72 and the centreline 101 of the mount 78 of the resilient member 37 being arranged substantially perpendicular to the central axis of the housing, when the central portion of the lever arm 35 is open and no longer co-axial with the centreline 72. A latch 46 is provided on the lever arm 35 which pivots in and out of the aperture 66 in the top of the housing. On the wet mate plug part 20, the flange 40 comprises a half flange mating arrangement having a flat edge that the latch 46 of the pivot arm 35 can latch to when the mate is complete, as well as the guide piece 41 providing a conical surface of the mating arrangement that the latch 46 slides along as the ROV moves the plug further in.

FIGS. 5*a* to 5*c* illustrate the steps in coupling the two connector parts 20, 21 together. As shown in FIGS. 3*a* and 3*b*, the ROV manipulator 39 takes hold of the ROV handle 38 on the plug 20 and inserts the plug into the coupler body 31 until the tip of the plug starts to enter the funnel shaped inner surface of the guide piece 45, within the coupler body. Thereafter, as seen in FIGS. 5*a* and 5*b*, further movement inwards of the plug 20 by the ROV manipulator 39, brings the plug tip to the inner guide cone 47 of the coupler and the guide piece 41 of the plug starts to enter the funnel and move towards the mated state. The guide piece 41, or holder cone mating arrangement, is fitted around part of the wet mate plug 20 and the flange 40 comprises a half flange arrangement at a radially outward end of the holder cone 41, adapted to interact with a surface of the latch 46 on the coupler pivot arm 35 to hold the plug 20 in place, when fitted. Just prior to the final engagement, about 5 mm to 10 mm before the mated state, where the springs 64 are being activated, the latch-arm snaps in, keeping the springs 64 positively activated "as mated." The flange 40 and handles 38 are typically metal, for example carbon steel, or stainless steel, in particular, austenitic stainless steel, which has a crystal structure that prevents heat hardening and makes the material non-magnetic.

In FIG. 5*a*, the tip of the plug 20 is partly inserted into an opening of a receptacle shroud, beyond the guide piece 45. The ROV manipulator 39 holding onto the ROV handle 38 has inserted the plug until its tip has started to enter the receptacle 21 itself. Proper angular guiding, fine alignment, is provided by radial contact between the tip of the plug and the receptacle shroud and by radial contact between the holder cone of the plug guide piece 41 and inner surface 47 of the guide piece 45 in the funnel cradle. High contact forces are avoided, as there are no short distances between force pairs. The tip of the locking latch 46 can be seen just about to hit the guide piece holder cone 41. In this initial state, the lever arm is in its closed position, held in place by the force exerted by the resilient member 37 of the lever arm 35. The centreline 101 of mount 78 of the resilient member 37 is arranged substantially parallel to the longitudinal axis 72 of the housing. The longitudinal axis 101 of the mount 78 of the resilient member forms an acute angle with the longitudinal axis 72 of the housing when the lever arm 35 is in its closed position. As the angled surface of the cone 41 contacts the tip of the locking latch 46, a force from the ROV arm starts to be applied to the lever arm 35, acting against the force applied by the resilient member 37, lifting the lever arm 35 and compressing the resilient member 37 on its mount 78, In FIG. 5*b*, as insertion of the plug 20 continues under control of the ROV, the tip of locking latch 46 is lifted further by sliding against holder cone guide piece 41 and half flange 40 and the resilient member 37 is compressed further until the lever arm 35 reaches its fully open position, with the resilient member 37 fully compressed on its mount 78 and the longitudinal axis 101 of the mount 78 being substantially perpendicular to the longitudinal axis 72. The tip of the receptacle shroud hits a shoulder of the plug.

FIG. 5*c* illustrates how, as insertion of the plug continues, the shoulder of the plug pushes against the tip of the receptacle shroud and moves the receptacle. The spring 37 on the opposite end of the lever arm 35 which has been compressed as the compliant mount flange 40 is being separated from the structure interface and the lever arm is forced into its open position, is able to expand again as the locking latch 46 snaps in behind the flange 40 and provides locking of the plug 20 against receptacle 21. As the lever arm 35 returns to its closed position, the resilient member 37 and its mount 78 move from the mount axis 101 being substantially perpendicular to the centreline 72 of the housing, to rest with the mount axis at an acute angle to the centreline. The ROV now releases its grip and reliable connection has been achieved, including activation of springs 64.

The ROV arm grips the handle on the flying connector part and the weight of this part is low enough for the ROV to manage to hold it. For a single phase, there is a single shuttle pin for power in the plug and in the receptacle, a contact pin 48 in the centre mates with the shuttle pin 49 and pushes the shuttle pin back to make the electrical contact. The example plug or receptacle shown have a right angle termination, but as previously mentioned, this may also be done with straight connectors. On the subsea module, a plate may be welded onto the module structure and the rest of the receptacle 21 and coupler 30 mounted to that plate. The guiding arrangements must make sure that any ROV forces on the plug and receptacle are eliminated. The coarse alignment is done by the radial cone or funnel 45 and the mating structure 31. The fine alignment is from the internal shape of the plug and receptacle. To protect sensitive parts the plug and receptacle are initially gently touched together and only further inserted when properly aligned. As the mating steps proceed, the latch 46 on the pivot arm 35 opens up, then with further movement it drops back down, into place behind the metal flange 40 bolted to the thermoplastic guide piece 41. Radial loads are transferred into the funnel by the thermoplastic guide pieces 41 and 45 which react radial forces from the plug or receptacle and transmit those into the funnel of the coupler 30. The receptacle 21 moves on springs and radial loads go through to the thermoplastic pieces and mount sleeves 64. The resilient member expands again after the latch has engaged and biases the latch into the locked position. The ROV manipulator may then be detached and the arrangement stays locked. For large, heavy, connectors, it is hard to do an accurate manipulation with an ROV arm, so the mechanism of the present invention gives more certainty of a safe reliable alignment and connection without damage to the delicate parts of the connector.

The smaller secondary pivot arm 43 prevents the connector part from falling out completely when de-mating. The ROV pushes up the large pivot arm 35 and the compressed springs 64 help to push the plug away from the receptacle. The springs 64 are compressed by about 6 mm to 10 mm when the latch 46 is fitted over the flange 40. For demating, as the latch is lifted up, compressing the resilient member 37 and no longer applying a compression force to the compliant sleeve and springs 64, the sleeve and springs expand again and apply that ejection force to the plug. If the ejecting force is too strong, there is a risk that the flying lead connector part might drop to the seabed when the latch is moved away. This is addressed by the small arm 43 which catches the rotating plug 20 as it drops into a recess 70 in the housing below. This gives the ROV time to catch the handle 38 after lifting the secondary pivot arm 43 open and the connector part 20 can be moved away in a controlled manner. The ejector stopper may be used as a separate feature, not just in combination with the latching mechanism described above.

The mating arrangement provides for subsea mating by an ROV of a single phase electrical power connector, comprising the receptacle, typically fixed to an equipment module or its structure; and the plug part, fitted to a routable or moveable power cable that may come from a neighbouring equipment module, or topside, although, with suitable manipulator arms on the ROV, it could also be used to join two flying leads. The arrangement provides large alignment mismatch capacity to ease ROV operation. The alignment features provide coarse, intermediate and fine alignment stages, yet produce only low radial forces on the plug nose during alignment and mating. This reduces the risk of damage to the sliding surfaces, as well as lowering the risk of distortive deflection or deformation of the electrical pin.

As all the parts of the coupler are purely mechanical, no power, other than the mechanical force applied by the ROV arm as it brings the plug and receptacle into contact, for mating, or as it lifts the small arm, for demating, is needed. No actuators or drives are required, which simplifies operation and increases reliability. The use of an external coupler for joining a plug and receptacle subsea, using an ROV to carry out the mate, with a single latch mechanism per coupler to hold the plug and receptacle within the coupler firmly together is a simple, robust and reliable solution. An external coupler having a biased resilient member pivoting a lever arm is particularly suitable subsea, where any kind of sliding arrangement, where parts must slide relative to one another to make a connection, may corrode, or may become clogged up with marine growth, causing the parts to jam and connection, or disconnection, to fail. The design is particularly adapted for operation by an ROV, which avoids the need to bring a cable topside for connection.

The housing 31 in the form of a shroud or funnel fitted around the receptacle 21 provides multiple alignment features, increased catch, and coarse radial and angular alignment capacity, for insertion and mounting of first and second connector parts, the wet mate plug and receptacle. The external shroud or housing 31 works in combination with the internal guide funnel 45 or shroud of the receptacle, to provide a medium coarse alignment, and fine alignment, with reduced radial forces between the plug and receptacle. Only during the very final stage of mating, does the existing internal shroud of the receptacle 21 have to provide for angular fine-alignment. The external coupler housing 31 solution, in combination with the compliant mount 33 of the receptacle, then ensures very low interference forces between the plug and receptacle at all stages. This protects the internal shroud of the receptacle, as well as the electrical pin 73 from unfavourable loading or interferences during and after mating. The locking mechanism 40, 46 between the two connector parts is located externally rather than as a mechanism directly at or in the plug and receptacle interfaces. This is a more cost-effective solution and a more robust and reliable mechanism. Another advantage is that the features of the mating arrangement make it possible to allow for reasonable materials and relaxed tolerances.

For a connection operation, the ROV manipulator grips the ROV handle 38 to insert the plug 20 gradually; until fully inserted and latched to the receptacle 21, providing reliable electrical connection. This is achieved by the ROV manipulator 39 griping onto the handle 38 then lifting the plug and aligning it towards the housing opening 32 until the plug tip starts to enter the housing 31. The ROV manipulator 39 holds onto the handle and continues to insert the plug until its tip has started to enter the inner guide cone 47 and the holder cone of the guide piece 41 has started to enter the opening 32. The handle and plug are moved further to insert the plug tip into an opening of the shroud of the receptacle. Guiding and alignment are provided by the plug half flange 40 and guide piece 41 against the latch 46 and guide cone 47. The tip of the plug 20 is inserted further to enter the shroud of the receptacle, until the lower tip of locking latch just hits the top surface of the guide piece 41. Proper angular guidance and alignment is provided by radial contact between the tip of the plug and the shroud of the receptacle and radial contact between the guide piece 41, flange 40 and inner surface of the housing 31. High radial alignment forces are avoided as short distances between radial force-pair are avoided by design.

As the insertion of the plug continues until its shoulder contacts the tip of the receptacle, the latch pivots to an opening position by sliding its lower tip against the guide piece 41 and flange 40. As insertion of the plug continues, its shoulder pushes against the tip of the receptacle and move the receptacle a few millimetres in the direction of insertion. The resilient members on the pins, in this case, springs become compressed as the mount flange 33 is being separated from the structure interface. The latch 46 of the lever arm 35 snaps into place behind the flange 40 and provides locking of the plug against the receptacle. The ROV can now release its grip and reliable connection has been achieved. The springs on the pins 42 provide ample pre-loading between the flange 40 and the latch.

For a disconnection operation, the ROV manipulator pivots or flips the locking latch to an open position, allowing the preloaded springs 74 of mount sleeve pins 42 to eject the plug outwards as follows. The ROV manipulator lifts the finger-shaped tip of the pivot arm 35, which pivots until de-latch of the plug 20 is achieved. The plug 20 is then ejected outwards, the ejection velocity being low due to the dampening effect of the water within the coupler, as a water piston effect. The plug falls into a recessed profile inside the coupler housing 31. The ROV manipulator 39 grips onto the handle 38 and retrieves the plug 20 from its resting position in the housing 31. The ROV brings the plug 20 away from its previous connected position with the receptacle 21 and the disconnection operation is completed.

An alternative process by which the connection of the two connector parts is carried out is that the ROV manipulator 39 grips onto the ROV handle 38 and lifts the plug 20 to align it with the funnel opening 32, then moves it into the funnel This movement continues until the plug tip has started to enter inner the guide cone 45 and holder cone 41 has started to enter the housing 31. The plug 20 is moved further into the housing, until its tip is inserted into an opening of the shroud of the receptacle 21. Alignment is provided by the plug 20, half flange 40 and cone 41 against the housing 31 and its guide cone 45. The tip of the plug 20 is inserted further into the shroud of the receptacle 21, until the lower tip of the latch 46 just hits the top of the cone 41. Proper angular guidance and alignment is provided by radial contact between tip of the plug with the shroud of the receptacle; and radial contact between the conical guide surface 31, the half flange 40 and the housing 31. High radial alignment forces will be avoided, since a short distance between radial force-pair is avoided by design. Insertion of the plug 20 continues until its shoulder contacts the tip of the receptacle and the locking latch 46 pivots to an open position by sliding its lower tip against the cone 41 and the half flange 40. As insertion of the plug 20 continues, its shoulder pushes against the tip of the receptacle 21 and moves the receptacle a few millimetres in the direction of insertion. The springs 74 then become compressed as the inboard compliant mount flange 33 is being separated from the structural interface 65. The latch 46 snaps in behind the half flange 41 and locks the plug and receptacle together. The ROV can now release its grip and reliable connection has been achieved. The springs 74 provide ample pre-loading between the half flange 40 and latch 46.

Many of the components are metal, for example carbon steel or stainless steel. For example, the coupling arrangement may comprise carbon steel for the funnel part of the coupler body 31, for the pivot arm 35 and latch 46, for the inboard compliant mount flange 33, for the compliant mount sleeve 42 and for the ejection stopper or small pivot arm 43. Other components may be moulded plastic or thermoplastic, such as the guide pieces 41, 45.

The flow diagram of FIG. 6 illustrates in more detail the steps required to connect using the subsea coupler arrangement of the present invention. Before deployment subsea, the coupler 30, including a guide cone 47 within a funnel part 31 is fixed 50 to the first connector part 21, in this case a receptacle and a guide piece 41 is fixed 51 to the second connector part 20, in this case a plug. After deployment subsea, the ROV grips 52 the plug handle 38 with its manipulator grip 39 and the plug 20 is moved 53 axially toward the receptacle and guided by the conical inner surface of the first guide piece, the guide cone 47, into an opening of the receptacle 21. At this point, there may be a small amount of vertical displacement 54 of the small lever arm 43, the subsidiary arm, or ejection stopper, as that arm is flipped open due to its depending latch encountering and sliding up the outer conical surface of the second guide piece 41. As the plug moves further into the receptacle, with the subsidiary arm 43 still flipped up, this further movement of the plug 20 toward the receptacle 21 by the manipulator 39 brings the conical outer surface of the second guide piece 41 into contact with the latch 46 of the larger lever arm 35, which also begins to pivot up 54. The latch continues to slide along the conical outer surface of guide piece 41 flipping the lever arm 35 up until the lever arm is able to pivot back into its rest position, after the latch 46 has move sufficiently far axially to have passed 55 the flange. Thereafter, the effect of the compliant spring 37 on the pivot arm 35 is to push the latch back down though its opening 66 in the top of the housing of the coupler and into position behind the flange 40. The conical surfaces of the two guide pieces 41, 47 are adjacent and the pins and socket contacts of the plug and receptacle are in electrical contact. The ROV manipulator arm may then let go of its grip 39 on the handle of the plug 20 and move to its next task. The secondary arm 43 interlocks 56 with the lever arm and prevents accidental loss of the plug onto the seabed when the connector parts are demated.

When de-mating the plug 20 for retrieval, the subsidiary arm 43 prevents the plug from being ejected too far from the coupler before the ROV manipulator can take hold of it. As the larger pivot arm 35 is flipped open by ROV lifting the protrusion 67, the plug is pushed back out due to the spring force that the latch 46 holds the plug in against. The plug 20 is stopped from being fully ejected and falling to the seabed by the small arm 43. The latch on the small arm keeps the plug at a safe resting position in a recess inside the funnel of the coupler. Thereafter, the subsidiary arm 43 can be flipped open to allow ROV to retrieve the plug from the funnel of the coupler. The subsidiary arm 43 stays lifted due to the interference of an end 69 of that arm with a recess 68 in a tip of the pivot arm 35.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. An ROV mateable subsea coupler for subsea coupling of a first wet mate connector part to a second wet mate connector part, the subsea coupler comprising:

a housing having a longitudinal axis, a first end and a second end and defining a hollow core, the longitudinal axis running along a centreline of the hollow core and adapted to be co-axial with a centreline of the first and second wet mate connector parts;

wherein the first end of the housing is adapted to be mounted to the first wet mate connector part; wherein the second end of the housing is adapted to receive the second wet mate connector part;

wherein the coupler further comprises a lever arm pivotally mounted to the housing;

wherein the lever arm comprises a latch adapted to cooperate with a surface of a guide piece of the second wet mate connector part; wherein the lever arm comprises a resilient member on a mount, the mount comprising a mount axis adapted to be arranged substantially perpendicular to the longitudinal axis of the housing when the lever arm is in its open position, the resilient member being remote from the latch and from the second end of the housing; wherein the resilient member biases the lever arm towards a closed position, coaxial with the longitudinal axis of the housing, in which position the latch protrudes through an aperture in the housing and wherein the mount axis of the resilient member on the mount is arranged at an acute angle to the longitudinal axis of the housing when the lever arm is in its closed position.

2. A coupler according to claim 1, wherein the resilient member comprises a spring in compression, or a compressible rubber washer.

3. A coupler according to claim 1, further comprising a secondary pivot arm, mounted to an outboard end of the housing.

4. A coupler according to claim 1, wherein the first wet mate connector part further comprises a first guide member to guide the second wet mate connector part into the first wet mate connector part and provide coarse alignment of the connector parts.

5. A coupler according to claim 4, wherein the first guide member comprises a conical inner surface.

6. A coupler according to claim 4, wherein the first guide member comprises one or more cylindrical outer surface sections.

7. A coupler according to claim 4, wherein the second wet mate connector part further comprises a second guide member to guide the latch toward the flange.

8. A coupler according to claim 1, wherein the first wet mate connector part comprises a receptacle and the second wet mate connector part comprises a plug.

9. A coupler according to claim 1, wherein the second wet mate connector part is connected to a cable, jumper or hose and wherein the first wet mate connector part is fixedly mounted to a subsea module or frame.

10. A coupler according to claim 1, wherein at least one of the housing, or lever arm comprises a metal.

11. A coupler according to claim 10, wherein the metal housing comprises carbon steel, or stainless steel, in particular austenitic stainless steel, or super-duplex.

12. A coupler according to claim 4, wherein the first guide member and second guide member comprise a plastic, thermoplastic or seawater resistant metal.

13. A method of coupling a first subsea connector part to a second subsea connector part, the connector parts comprising a first wet mate connector part and a second wet mate connector part; the method comprising:

mounting a coupler housing to the first wet mate connector part;

mounting a guide piece to the second wet mate connector part, griping a handle of the second wet mate connector part with a manipulator of a remotely operated vehicle;

using the manipulator to move the second wet mate connector part towards an opening in the coupler housing; causing a lever arm of the coupler to slide over the guide piece and locate behind a flange adjacent to the guide piece;

wherein a resilient member of the lever arm is arranged on a mount comprising a mount axis, wherein the mount axis is arranged to be substantially perpendicular to the longitudinal axis of the housing when the lever arm is in its open position, and biases the lever arm in position to hold the connectors in their mated state, wherein the resilient member of the lever arm is arranged on its mount with the mount axis at an acute angle to the longitudinal axis of the housing, when the lever arm is in its closed position.

14. A method of decoupling a first subsea connector part from a second subsea connector part to which it is mated, the connector parts comprising a first wet mate connector part and a second wet mate connector part; the method comprising:

lifting a lever arm of a coupler with a manipulator arm of a remotely operated vehicle, such that a resilient member of the lever arm, on a mount, is moved to an open position, the longitudinal axis of the mount being substantially perpendicular to a longitudinal axis of the housing in the open position, the lever arm being moved against a force exerted by the resilient member, to disengage the lever arm latch from a flange adjacent to a guide piece on the second wet mate connector part;

allowing the second wet mate connector part to disengage from the first wet mate connector part and move away from the first wet mate connector part until a secondary arm engages the flange on the second wet mate connector part;

moving the manipulator to grip a handle of the second wet mate connector part; using the manipulator to disengage the second wet mate connector part from the secondary arm and move the second wet mate connector part away from an opening in the coupler housing to demate the first and second wet mate connector parts; and allowing the resilient member of the lever arm, on the mount, to return to a closed position, the longitudinal axis of the mount being at an acute angle to a longitudinal axis of the housing.

15. A method according to claim 13, wherein coupling or decoupling is from or to a module comprising one of a subsea transformer, a subsea compressor, a subsea variable speed drive, a subsea separator, or a module for an offshore wind turbine.

16. A method according to claim 14, wherein coupling or decoupling is from or to a module comprising one of a subsea transformer, a subsea compressor, a subsea variable speed drive, a subsea separator, or a module for an offshore wind turbine.

* * * * *